Dec. 14, 1948.  J. J. PETTIPIECE  2,456,019
MOTOR ATTACHMENT FOR TRACTORS
Filed Feb. 12, 1947
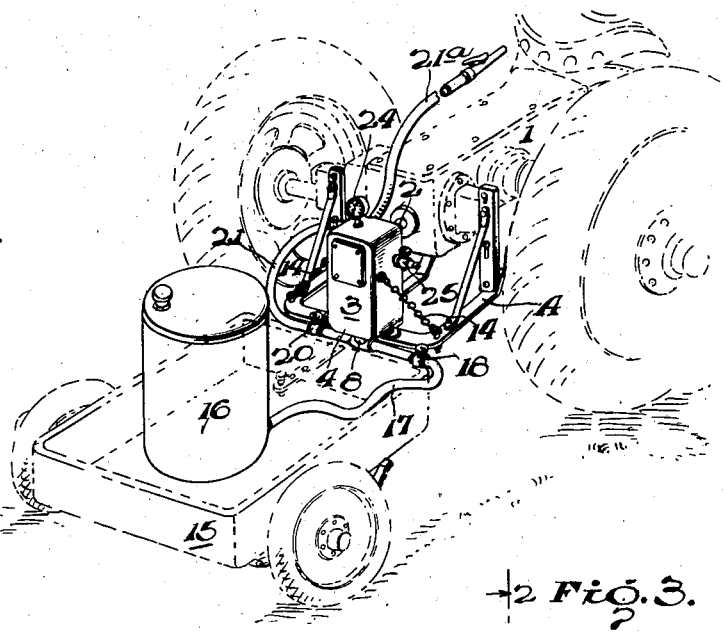
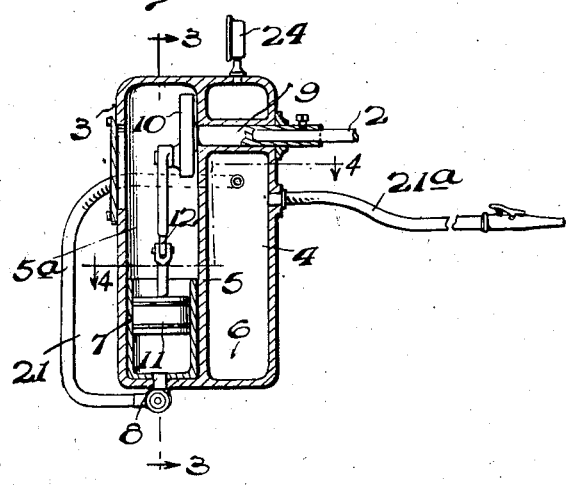
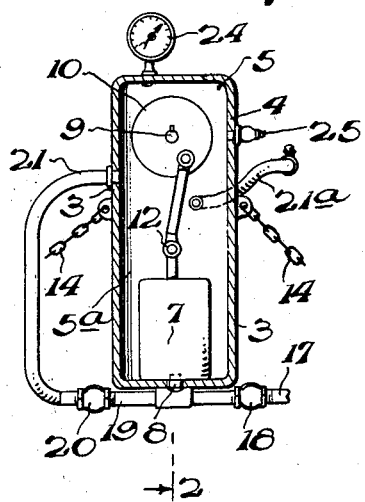
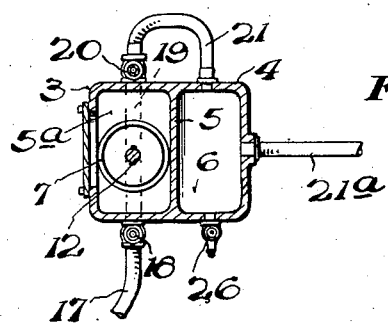
Inventor
JOHN J. PETTIPIECE
By
Attorney Patented Dec. 14, 1948

2,456,019

UNITED STATES PATENT OFFICE 2,456,019

MOTOR ATTACHMENT FOR TRACTORS

John J. Pettipiece, Powell, Wyo.

Application February 12, 1947, Serial No. 728,116

2 Claims. (Cl. 103—218)

This invention relates to improvements in a means to utilize the power from the drive shaft of a tractor to supply liquid under pressure for spraying purposes.

The object of the invention is to construct an apparatus to contain a pump and compression chamber to conveniently mount same on a tractor to utilize the power from said tractor to store a supply of liquid under pressure to be distributed at will by the operator.

A further object of the invention is to so arrange the unit on the tractor that the pump will be utilized by the tractor power to draw a supply of liquid from a tank or the like mounted on a trailer coupled to the tractor.

In the drawings:

Figure 1 is a view showing the application of the invention; portions of a tractor and trailer being shown in dotted lines;

Figure 2 is a central section of the unit;

Figure 3 is a similar section taken at right angles to Figure 2;

Figure 4 is a horizontal section taken on the line 4—4 of Figure 2.

Referring now to the drawings, a standard farm type tractor 1 having the usual rear power take-off shaft 2 is indicated in broken lines in Fig. 1. Mounted on the tractor adjacent the power take-off shaft 2 is a pressure unit 3 which comprises a casing 4, divided vertically by an integral partition 5 to provide a pump compartment 5a and a compression chamber 6.

In the bottom of the pump compartment is located a pump cylinder 7, and communicating with the cylinder is a pipe 8. Mounted in the upper part of the casing is a hollow shaft 9, one end of which extends into the pump chamber 5a, where it is provided with a disc 10. Operating in the cylinder 7 is a piston 11, and extending therefrom is a connecting rod 12, pivoted at its upper end to the disc 10.

The free end of the power take-off shaft 2 of the tractor is inserted in the open end of the shaft 9, to transmit power to operate the pump, as will be described.

Extending from the rear of the tractor is a frame A, and connecting the casing 4 with this frame are chains 14 to support and retain said casing in position on the tractor.

Attached to the frame A of the tractor is a sled or trailer, indicated at 15. This trailer supports a tank or receptacle 16, which carries a supply of combustible oil or insecticide.

Connecting the lower part of the tank 16 with the pipe 8 is a pipe 17 provided with a check valve 18 to open when the piston is on its upstroke and close when said piston is on its downstroke. Connected to the pipe 8 is a second pipe 19 having a check valve 20 adapted to open when the piston is on its downstroke and close when the piston is on its upstroke. From the valve 20 extends a pipe 21 which leads to the compression chamber 6.

Extending from the compression chamber 6 and in convenient reach of the driver is a hose 21a, having a controlled nozzle, by means of which the operator may direct a spray under pressure for destroying weeds or for other purposes.

On the top of the casing 4 is a gauge 24, and from the side is a safety valve 25.

It will be understood that the casing 4 and the trailer comprise an attachment for the tractor and are only used when it is desired to employ a spray.

In operation, the shaft 2 is engaged in the open end of shaft 9 to connect the casing 4 to the tractor, then the chains 14 are connected to the frame A. The trailer carrying the tank is coupled to the frame, and thereafter the pipe 17 is connected to the pipe 8.

By this connection the attachment can be employed by operation of the power take-off and, if desired, as the tractor moves over the ground. The power take-off operates the pump, which draws the liquid from the tank to the cylinder 7, and subsequently forces the liquid under pressure through pipe 21 to the compression chamber. Obviously, the operator can then spray the liquid for any desired purpose, such as spreading poison over the adjacent weeds.

The construction has many advantages in that it is easy to mount the unit on a tractor and attach a vehicle with the tank of liquid to the tractor. As the compression chamber is mounted on the power take-off shaft, it is evident the distributing hose and nozzle can be conveniently handled during the spraying operation.

Thus, a portable spraying arrangement which affords economy in power and convenience in operation, is provided.

What I claim is:

1. A unitary apparatus for attachment to, and use with a tractor having a power take-off shaft, which apparatus comprises a casing, a pump chamber and a compression chamber in the casing, a pump in said pump chamber, a pump shaft in said casing and for operating said pump, detachable means for drivingly connecting the pump shaft directly to the power take-off shaft, passage means connected with the pump chamber and leading from the pump chamber to the compression chamber to supply liquid under pressure to said compression chamber, and a hose connected to the compression chamber to distribute the liquid.

2. An apparatus for attachment to and use with a tractor having a power take-off shaft, comprising as a separable unit, a casing, a partition integral with the casing to divide the casing into a pump compartment and a compression chamber, a pump in the pump compartment, a hollow shaft rotatably mounted in said casing for driving said pump and to removably receive the end of a power take-off shaft of a tractor for driving connection therewith, means for holding the casing in relation to the power shaft of the tractor, means including a check valve for supplying liquid to the pump, means including a check valve for supplying liquid under pressure from the pump to the compression chamber, and a hose extending from the compression chamber to distribute the liquid under pressure.

JOHN J. PETTIPIECE.

REFERENCES CITED

The following references are of record in the file of this patent:

UNITED STATES PATENTS

| Number | Name | Date |
| --- | --- | --- |
| 206,451 | Holland | July 30, 1878 |
| 707,284 | Wagner | Aug. 19, 1902 |
| 1,374,274 | Barrett | Apr. 12, 1921 |
| 1,465,377 | Strain | Aug. 21, 1923 |
| 1,538,881 | Barton | May 26, 1925 |
| 1,648,154 | Steiger | Nov. 8, 1927 |
| 1,754,490 | Stewart | Apr. 15, 1930 |